United States Patent
Tsubaki

(10) Patent No.: US 9,800,029 B2
(45) Date of Patent: Oct. 24, 2017

(54) FLAT-CABLE GUIDE DEVICE

(71) Applicant: Yazaki Corporation, Minato-ku, Tokyo (JP)

(72) Inventor: Akira Tsubaki, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/039,187

(22) PCT Filed: Nov. 18, 2014

(86) PCT No.: PCT/JP2014/080555
§ 371 (c)(1),
(2) Date: May 25, 2016

(87) PCT Pub. No.: WO2015/079983
PCT Pub. Date: Jun. 4, 2015

(65) Prior Publication Data
US 2017/0170641 A1    Jun. 15, 2017

(30) Foreign Application Priority Data
Nov. 26, 2013    (JP) .................................. 2013-244264

(51) Int. Cl.
*H02G 3/04*    (2006.01)
(52) U.S. Cl.
CPC .................................. *H02G 3/0437* (2013.01)
(58) Field of Classification Search
CPC combination set(s) only.
See application file for complete search history.

(56) References Cited

U.S. PATENT DOCUMENTS

| | | | |
|---|---|---|---|
| 6,908,140 B1 | 6/2005 | Carter et al. | |
| 9,404,557 B2 * | 8/2016 | Kaihotsu | F16G 13/16 |
| 2004/0108127 A1 | 6/2004 | Aoki et al. | |
| 2009/0044455 A1 | 2/2009 | Enomoto et al. | |

FOREIGN PATENT DOCUMENTS

| | | |
|---|---|---|
| CN | 1660618 A | 8/2005 |
| CN | 101242973 A | 8/2008 |
| CN | 102481864 A | 5/2012 |
| EP | 1314613 A2 | 5/2003 |
| JP | 2001128350 A | 5/2001 |
| JP | 2002-359917 A | 12/2002 |

(Continued)

OTHER PUBLICATIONS

Jan. 27, 2015—International Search Report—Intl App PCT/JP2014/080555.

(Continued)

*Primary Examiner* — Dhirubhai R Patel
(74) *Attorney, Agent, or Firm* — Banner & Witcoff, Ltd.

(57) ABSTRACT

A flat-cable guide device (1) includes first and second cable guide paths (30, 40) in which slits (S2) of rear end walls (32, 42) which respectively allow a flat cable (200) to be inserted are provided so as to be inclined at a prescribed angle (θ) to slits (S1) of front end walls (31, 41) and a third cable guide path (50) which connects the slits (S2) and (S2) in the rear end walls (32) and (42) of the two guide paths by a U-shaped guide path (53) in which the flat cable (200) can move.

5 Claims, 6 Drawing Sheets

(56) References Cited

FOREIGN PATENT DOCUMENTS

| | | |
|---|---|---|
| JP | 3834249 B2 | 10/2006 |
| JP | 2007-104828 A | 4/2007 |
| JP | 4429573 B2 | 3/2010 |
| JP | 2010-213399 A | 9/2010 |

OTHER PUBLICATIONS

May 31, 2016—(PCT) IPRP—App PCT/JP2014/080555.
Mar. 30, 2017—(CN) The First Office Action—App 201480064469.
X, Eng Tran.

\* cited by examiner

FLAT-CABLE GUIDE DEVICE

TECHNICAL FIELD

The present invention relates to a flat-cable guide device.

BACKGROUND ART

FIG. 6 shows a flat-cable guide device disclosed in below-described patent literature 1.

This flat-cable guide device 100 is a device which applies a displacement in a direction of width to a flat cable 120 without deteriorating a mobility of the flat cable 120 when the flat cable 120 is arranged in a movable part of, for instance, a slide door or slide seat of a vehicle.

The flat-cable guide device 100 includes a device main body 101 having a substantially S-shaped cable arrangement path 110 with its upper part opened, cable holding members 102 attached to the device main body 101 to regulate a position of the flat cable 120 in the device main body and a cover 103 which covers an opening part of the device main body 101.

The cable arrangement path 110 has a structure that a first horizontal arrangement path 111 which is extended in a horizontal direction, an inclined arrangement path 112 which is extended obliquely and upward from one side in an end of the first horizontal arrangement path 111, a second horizontal arrangement path 113 which is extended in a horizontal direction from one side in an end of the inclined arrangement path 112 are formed integrally. The arrangement paths 111, 112 and 113 are respectively formed in structures whose sectional configurations are U-shaped by bottom walls and both side walls which are allowed to stand upright in both sides of the bottom walls.

In the first horizontal arrangement path 111 and the second horizontal arrangement path 113, the flat cable 120 is horizontally arranged under a standing attitude with its direction of width directed to a vertical direction. To these horizontal arrangement paths 111 and 113, the above-described cable holding members 102 are respectively attached.

The cable holding member 102 includes one pair of holding members 102a and 102b which hold both surfaces of the flat cable 120 from a direction of thickness to hold the flat cable 120 in a standing position. The one pair of holding members 102a and 102b are independent components separate from the device main body 101 and fixed to the horizontal arrangement paths 111 and 113 respectively by engagements of protruding and recessed parts 111a and 113a for engagement formed in the horizontal arrangement paths 111 and 113.

The one pair of cable holding members 102a and 102b respectively fixed to the horizontal arrangement paths 111 and 113 support the flat cable 120 so as to move the flat cable 120 in the horizontal direction with its standing attitude maintained.

In the flat cable 120 arranged in the inclined arrangement path 112, curved parts 121 and 122 are formed which are curved with a prescribed bend radius in two positions of a lower end side and an upper end side of the inclined arrangement path 112. In the curved part 121 of the lower end side of the inclined arrangement path 112 and the curved part 122 of the upper end side, twists directed to opposite directions to each other are applied to the flat cable 120. Since the twists in the opposite directions are respectively applied in the curved parts 121 and 122 of the two positions, the flat cable 120 inserted into the second horizontal arrangement path 113 is returned to the standing position in which the direction of width is directed to the vertical direction like the flat cable 120 inserted into the first horizontal arrangement path 111.

In the case of the above-described flat-cable guide device 100, a quantity of displacement in a direction of a width dimension applied to the flat cable 120 to be arranged corresponds to a height dimension of the inclined arrangement path 112.

CITATION LIST

Patent Literature

Patent Literature 1: JP-A-2007-104828

SUMMARY OF INVENTION

Technical Problem

However, in the flat-cable guide device 100 disclosed in the patent literature 1, since the flat cable 120 is arranged substantially in the shape of a character S and the first horizontal arrangement path 111 and the second horizontal arrangement path 113 are extended in the same direction, as a size of the device, lengths L1 and L2 of the horizontal arrangement paths in the horizontal directions are added so that a length dimension of the device in the horizontal direction is enlarged. Thus, a problem arises that a large arrangement space is necessary.

Further, in the flat-cable guide device 100 disclosed in the patent literature 1, since the flat cable 120 is arranged substantially in the shape of the character S, the displacement in the direction of width can be applied to the flat cable, however, a reversing movement cannot be applied to the flat cable. Accordingly, when the reversing movement is necessary, the flat cable guided outside the device needs to be returned and newly form a reversing part. Thus, a problem arises that the flat-cable guide device is hardly used in an arrangement part which requires the reversing movement of the flat cable.

Further, in the flat-cable guide device 100 disclosed in the patent literature 1, the curved parts 121 and 122 are formed in the flat cable 120 in the two positions of the upper and lower sides of the inclined arrangement path 112 and the twists directed to the opposite directions to each other are applied to the flat cable 120 respectively in the curved parts 121 and 122. However, in the curved parts 121 and 122 which apply the twists directed to the opposite directions to the flat cable, structures are not provided which regulate the attitude of the flat cable 120. Accordingly, when the fat cable 120 led out from the cable guide device 100 is, for instance, pulled so that the flat cable 120 inserted into the flat-cable guide device 100 is movable (moves), the attitude of the flat cable 120 in the curved parts 121 and 122 respectively collapse. Thus, there is a fear that the curved parts 121 and 122 may possibly interfere with side walls of the device main body 101 to deteriorate the mobility of the flat cable.

Thus, it is an object of the present invention to solve the above-described problems and to provide a cable guide device which can apply a displacement in a direction of width and a reversing movement of a flat cable in a small space without deteriorating a mobility of the flat cable.

Solution to Problem

The above-described object of the present invention is achieved by below-described structures.

(1) A flat-cable guide device including:

a first cable guide path in which linear slits allowing a flat cable to be inserted are respectively provided in one pair of a front end wall and a rear end wall opposed to each other in front and rear parts and the slit in the rear end wall is inclined at a prescribed angle to the slit in the front end wall;

a second cable guide path in which linear slits allowing the flat cable to be inserted are respectively provided in one pair of a front end wall and a rear end wall opposed to each other in front and rear parts and the slit in the rear end wall is inclined at a prescribed angle to the slit in the front end wall and which is arranged so as to be spaced from the first cable guide path in a direction intersecting at right angles to an extending direction of the slit in the rear end wall of the first cable guide path; and a third cable guide path in which the slit in the rear end wall of the first cable guide path is connected to the slit in the rear end wall of the second cable guide path by a U-shaped guide path in which the flat cable is movable.

(2) A flat-cable guide device described in the above-described (1), wherein the first cable guide path and the second cable guide path have the same structures.

(3) A flat-cable guide device described in the above-described (2), wherein the first cable guide path and the second cable guide path are arranged in such a way that the front and rear positions are consistent.

According to the flat-cable guide device of the structure of the above-described (1), since the flat cable is inserted into the first cable guide path, to the flat cable led out from the first cable guide path, a twist is applied by an angle of inclination of the slit in the rear end wall of the first cable guide path.

Then, since the flat cable to which the twist is applied is inserted into the third cable guide path, to the flat cable led out from the third cable guide path, a displacement in a direction of width of the flat cable is applied with respect to a position of the flat cable when the flat cable is introduced to the first cable guide path.

Specifically, when angles of inclination of the slits respectively in the rear end walls of the first cable guide path and the second cable guide path relative to vertical surfaces are supposed to be "θ", a clearance between the slits of the rear end walls respectively is supposed to be "d", and the displacement in the direction of width of the arranged flat cable is supposed to be "e", the displacement "e" in the direction of width applied by the third cable guide path can be expressed by a below-described equation (1).

$$e = d \tan \theta \quad \text{Equation (1)}$$

Further, since the third cable guide path is the U-shaped guide path, the third cable guide path reverses the passing flat cable.

Namely, to the flat cable passing through the first cable guide path and the third cable guide path, the twist of the angle of inclination θ, the displacement e in the direction of width of the flat cable and a reversing movement are applied.

Then, when the flat cable passing through the third cable guide path is inserted into the second cable guide path, a twist in an opposite direction to that of the first cable guide path is applied in the second cable guide path. Accordingly, in the flat cable led out from the second cable guide path, the twist applied in the first cable guide path is cancelled each other. Thus, the flat cable has no twist and is in a state that the displacement e in the direction of width of the flat cable and the reversing movement are applied thereto.

Further, according to the flat-cable guide device of the structure of the above-described (1), the first cable guide path and the second cable guide path are parts which arrange the flat cable substantially in a linear configuration and the slits in both the ends of the guide paths respectively regulate an attitude of the flat cable. Accordingly, when the flat cable led out from the flat-cable guide device is, for instance, pulled so that the flat cable inserted into the device is moved in a direction of length of the cable, the attitude of the cable is not unstable. Further, the third cable guide path arranged between the first cable guide path and the second cable guide part is a part which arranges the flat cable in a configuration of a U-shape between the two slits parallel to each other. This part can also maintain the flat cable moving in the direction of length of the cable in a stable attitude.

Accordingly, in any of the guide paths forming the flat-cable guide device, the attitude of the flat cable is not unstable during a movement of the flat cable and a mobility of the flat cable is not deteriorated.

As described above, according to the flat-cable guide device of the structure of the above-described (1), the displacement in the direction of width of the flat cable and the reversing movement can be applied in a small space without deteriorating the mobility of the flat cable.

According to the flat-cable guide device of the structure of the above-described (2), since the first cable guide path and the second cable guide path have the same structures, kinds of components used in the device are reduced, so that a cost can be reduced.

According to the flat-cable guide device of the structure of the above-described (3), the first cable guide path and the second cable guide path are located within a duplicate length range and settled in the same occupied space. Accordingly, the device can be prevented from being enlarged and the flat cable can be arranged in a small space.

Advantageous Effects of Invention

In the flat-cable guide device according to the present invention, the displacement in the direction of width of the flat cable and the reversing movement can be applied in a small space without deteriorating the mobility of the flat cable.

The present invention is briefly described above. Further, when mode for carrying out the invention (refer it to as an "embodiment", hereinafter) which will be described below is read by referring to the attached drawings, a detail of the present invention will be more clarified.

DESCRIPTION OF EMBODIMENT

Figure 1:
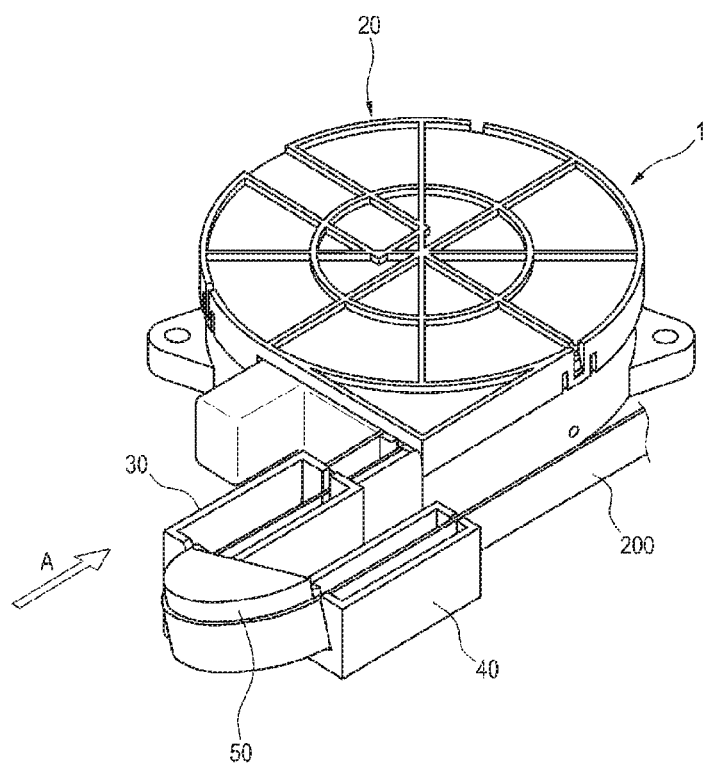
FIG. 1 is a perspective view of an assembled state of one embodiment of a flat-cable guide device according to the present invention.
Figure 2:
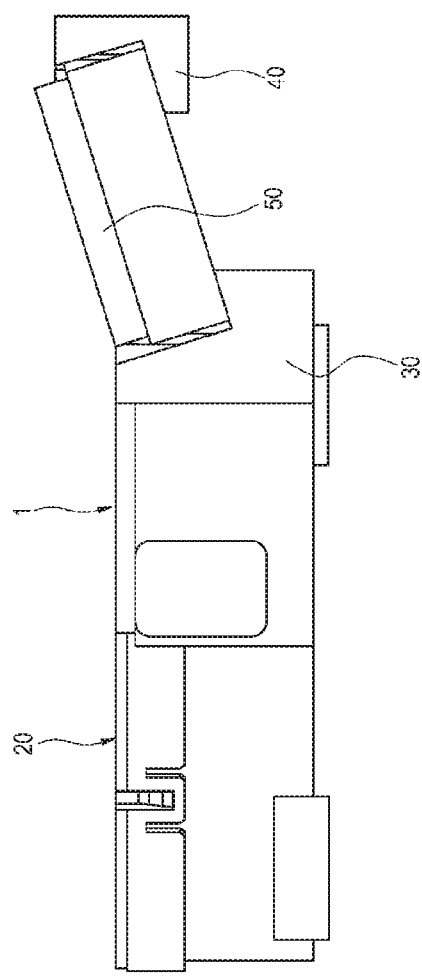
FIG. 2 is a view seen from an arrow mark A in FIG. 1.

Now, a preferred embodiment of a flat-cable guide device according to the present invention will be described below in detail by referring to the drawings.

The flat-cable guide device 1 according to one embodiment of the present invention is used when a flat cable 200 is arranged in a movable part, for instance, a slide door or a slide seat of a vehicle.

The flat-cable guide device 1 of the present embodiment includes, as shown in FIG. 1, a cable excess length winding device 20, a first cable guide path 30 into which the flat cable 200 pulled out from the cable excess length winding device 20 is inserted, a second cable guide path 40 arranged in parallel with the first cable guide path 30 and a third cable guide path 50 which establishes a connection between the first cable guide path 30 and the second cable guide path 40 to introduce the flat cable 200 led out from a slit S2 in a rear end wall 32 of the first cable guide path 30 to a slit S2 in a rear end wall 42 of the second cable guide path 40.

The cable excess length winding device 20 is a device which winds an excess length part of the flat cable 200 arranged in the movable part so as to be pulled out. An end part in a central part of winding of the flat cable 200 wound in the device is pulled outside the device from a cable taking out opening not shown in the drawing and connected to a cable connecting part of a fixed part through a connector. Then, the other end side of the flat cable 200 wound in the cable excess length winding device 20 is pulled out from a cable pulling out opening provided in an outer peripheral part of the cable excess length winding device 20, passed through the above-described first cable guide path 30, the third cable guide path 50 and the second cable guide path 40 in order and connected to a cable connecting part of a movable part not shown in the drawing through a connector.

The first cable guide path 30 is connected to the cable excess length winding device 20 to insert the flat cable 200 pulled out from the outer peripheral part of the cable excess length winding device 20.

Figure 3:
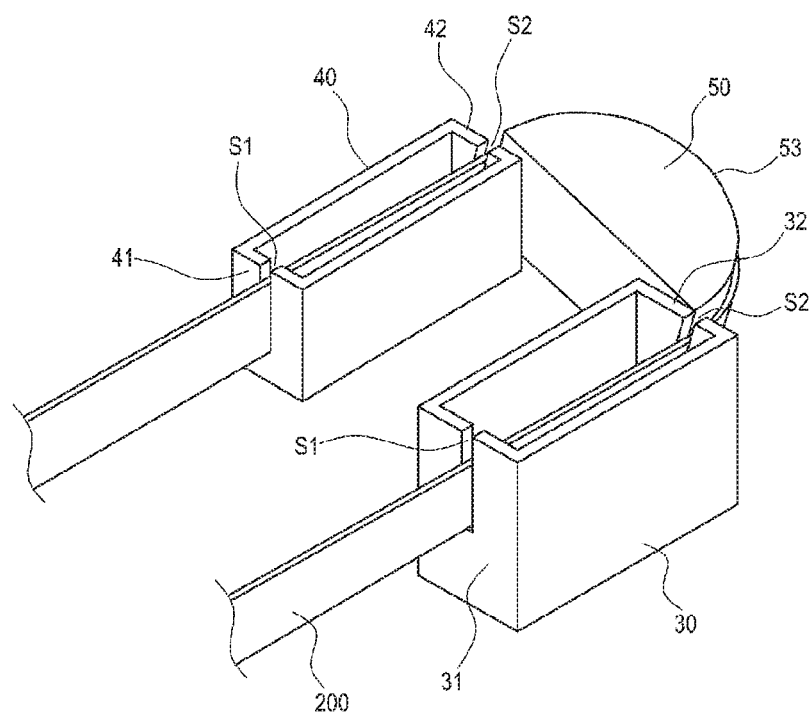
FIG. 3 is a perspective view of a state that a flat cable is arranged in a first cable guide path, a second cable guide path and a third cable guide path of the flat-cable guide device shown in FIG. 1.
Figure 4:
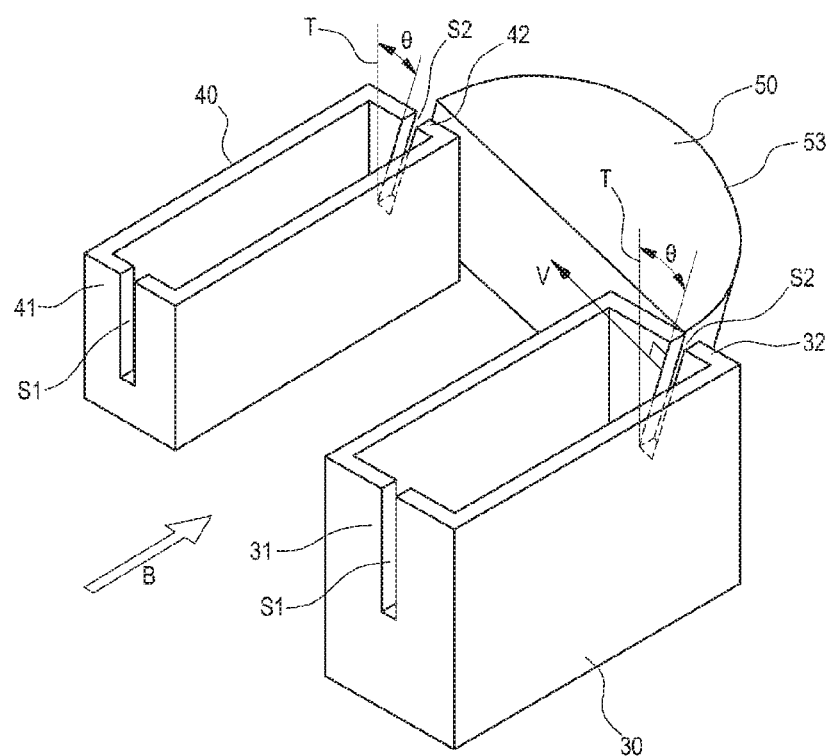
FIG. 4 is a perspective view of a state before the flat cable is arranged in the first cable guide path, the second cable guide path and the third cable guide path of the flat-cable guide device shown in FIG. 1.

As shown in FIGS. 3 and 4, the first cable guide path 30 supports the flat cable 200 by the linear slits S1 and S2 respectively formed in a front end wall 31 and the rear end wall 32 opposed to each other in a box-shaped structure with an upper part opened.

The slit S1 is a slit extending in a linear form along a vertical direction and formed in the front end wall 31. Further, the slit S2 is the linear slit formed in the rear end wall 32. The slit S2 of the rear end wall 32 is provided so as to be inclined at a prescribed angle θ to the slit S1 of the front end wall 31. Namely, the slit S2 is provided so as to be inclined by an angle θ relative to a vertical line T.

The slits S1 and S2 are respectively opened in upper end edges of the front end wall 31 and the rear end wall 32. Thus, the flat cable 200 is wedged in the slits S1 and S2 respectively from upper parts, so that the flat cable 200 can be inserted into the slits S1 and S2 respectively. Accordingly, an arrangement work of the flat cable 200 to the first cable guide path 30 is extremely simple.

In the first cable guide path 30 of the above-described present embodiment, as shown in FIG. 3, since the flat cable 200 with a direction of width directed to the vertical direction in a standing position is inserted into the slits S1 and S2 respectively, a twist of the prescribed angle θ is applied to the flat cable 200.

As shown in FIGS. 3 and 4, the second cable guide path 40 supports the flat cable 200 by the linear slits S1 and S2 respectively formed in a front end wall 41 and the rear end wall 42 opposed to each other in a box-shaped structure with an upper part opened.

The slit S1 in the second cable guide path 40 is a slit extending in a linear form along the vertical direction and formed in the front end wall 41. Further, the slit S2 in the second cable guide path 40 is the linear slit formed in the rear end wall 42. The slit S2 of the rear end wall 42 is provided so as to be inclined at the prescribed angle θ to the slit S1 of the front end wall 41. Namely, the slit S2 is provided so as to be inclined by the angle θ relative to the vertical line T.

In other words, in the second cable guide path 40, the linear slits S1 and S2 into which the flat cable 200 is inserted are respectively provided in the one pair of the front end wall 41 and the rear end wall 42 opposed to each other in front and rear parts as in the first cable guide path 30. Further, the slit S1 of the front end wall 41 and the slit S2 of the rear end wall 42 in the second cable guide path 40 are provided in the same positional relation as that of the first cable guide path 30. The front and rear parts in the flat-cable guide device 1 of the present embodiment designate front and rear parts in the extending direction of the first cable guide path 30 or the second cable guide path 40 and do not designate forward and rearward directions in a vehicle on which the flat-cable guide device is mounted.

Further, in the second cable guide path 40, the slits S1 and S2 are respectively opened in upper end edges of the front end wall 41 and the rear end wall 42. Accordingly, the flat cable 200 is wedged in the slits S1 and S2 respectively from upper parts, so that the flat cable 200 can be inserted into the slits S1 and S2 respectively. Thus, an arrangement work of the flat cable 200 to the second cable guide path 40 is extremely simple as in the case of the first cable guide path 30.

Figure 5:
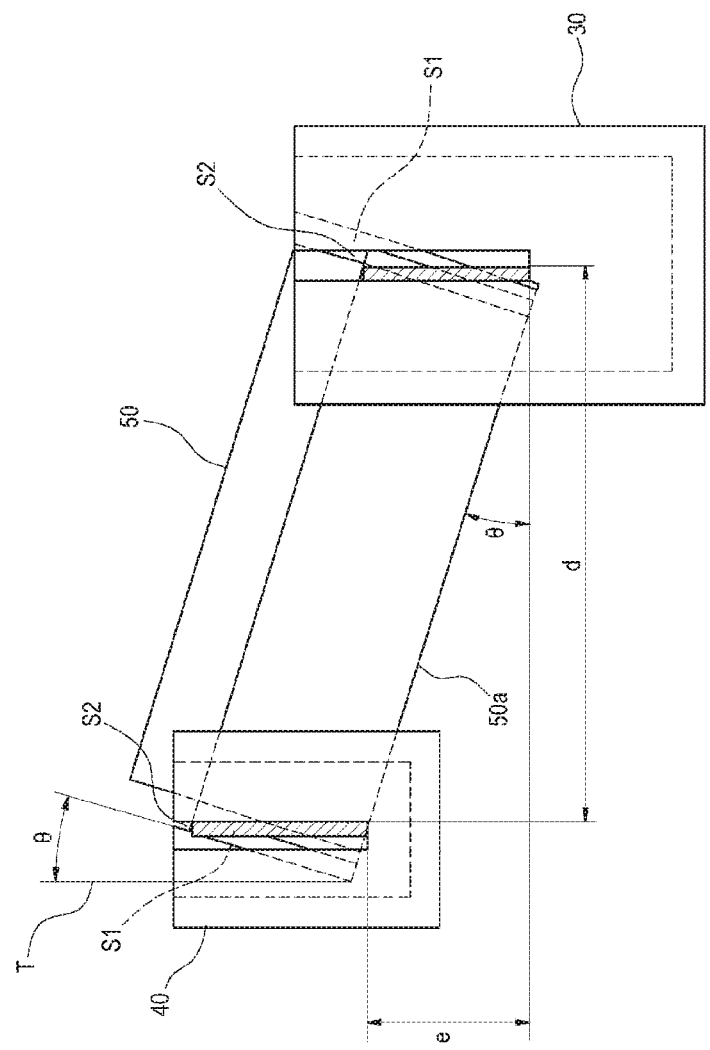
FIG. 5 is a view seen from an arrow mark B in FIG. 4.
Figure 6:
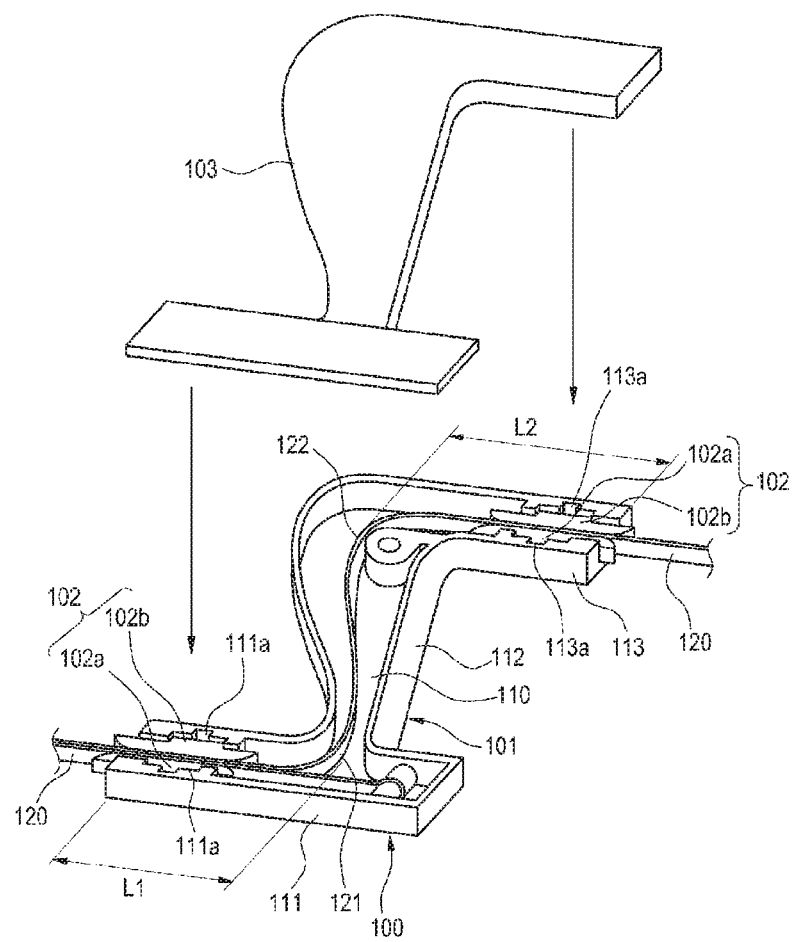
FIG. 6 is an exploded perspective view of a usual flat-cable guide device.

Further, in the second cable guide path 40, the front and rear positions are consistent to the front and rear positions of the first cable guide path 30, and further, the second cable guide path 40 is arranged so as to be spaced in a direction (a direction shown by an arrow mark V in FIG. 4) intersecting at right angles to the extending direction of the slit S2 in the rear end wall 32 of the first cable guide path 30 in a vertical plane relative to the first cable guide path 30. In other words, as shown in FIG. 5, the second cable guide path 40 is arranged so as to be parallel to the first cable guide path 30 in a position where the first cable guide path 30 is moved in parallel by a length d in the direction of its width and by a length e in a direction of its height.

As shown in FIG. 3, in the second cable guide path 40, since the flat cable 200 is inserted from the rear end wall 42 to the front end wall 41, a twist in an opposite direction to that of the first cable guide path 30 is applied to the flat cable 200 to return the twist applied by the first cable guide path 30 and lead out the flat cable 200 in a state having no twist.

In the first cable guide path 30 and the second cable guide path 40 described above, spaces of opposed side walls are set in such a way that the side walls which respectively enclose a periphery of the flat cable 200 do not come into contact with the flat cable 200. Accordingly, in the first and second cable guide paths 30 and 40, even when the flat cable 200 inserted into the cable guide paths is movable, the flat cable 200 does not come into contact with (interfere with) the opposed side walls in the first and second cable guide paths 30 and 40.

Further, in the present embodiment, the first cable guide path 30 and the second cable guide path 40 have the same structures.

As shown in FIG. 4, the third cable guide path 50 has a structure which connects the slit S2 in the rear end wall 32 of the first cable guide path 30 to the slit S2 in the rear end wall 42 of the second cable guide path 40 by a U-shaped guide path 53 in which the flat cable 200 is movable. The guide path 53 regulates a position of the flat cable 200 so that the flat cable 200 led out from the slit S2 of the first cable guide path 30 may be curved in the shape of a character U and introduced to the slit S2 of the second cable guide path 40.

When inclinations of the slits S2 in the first cable guide path 30 and the second cable guide path 40 are respectively supposed to be θ, as shown in FIG. 5, a bottom part 50a of the third cable guide path 50 is also inclined by the angle θ.

The third cable guide path 50 of the present embodiment turns the flat cable 200 led out from the slit S2 in the rear end wall 32 of the first cable guide path 30, and then, introduces the flat cable to the slit S2 in the rear end wall 42 of the second cable guide path 40.

In the flat-cable guide device 1 of the present embodiment described above, since the flat cable 200 is inserted into the first cable guide path 30, to the flat cable 200 led out from the first cable guide path 30, the twist is applied by the angle of inclination θ of the slit S2 in the rear end wall 32 of the first cable guide path 30.

Then, since the flat cable 200 to which the twist is applied is inserted into the third cable guide path 50, to the flat cable 200 led out from the third cable guide path 50, a displacement e in a direction of width of the flat cable 200 is applied, as shown in FIG. 5, with respect to a position of the flat cable 200 when the flat cable is introduced to the first cable guide path 30.

Specifically, when angles of inclination of the slits S2 respectively in the rear end walls 32 and 42 of the first cable guide path 30 and the second cable guide path 40 relative to vertical surfaces are supposed to be θ, a clearance between the slits S2 of the rear end walls 32 and 42 respectively is supposed to be d, and the displacement in the direction of width of the arranged flat cable 200 is supposed to be e, the displacement e in the direction of width applied by the third cable guide path 50 can be expressed by the above-described equation (1).

Further, since the third cable guide path 50 is the U-shaped guide path, the third cable guide path 50 turns the passing flat cable 200.

Namely, to the flat cable 200 passing through the first cable guide path 30 and the third cable guide path 50, the twist of the angle of inclination θ, the displacement e in the direction of width of the flat cable 200 and a reversing movement are applied.

Then, when the flat cable 200 passing through the third cable guide path 50 is inserted into the second cable guide path 40, a twist in an opposite direction to that of the first cable guide path 30 is applied in the second cable guide path 40. Accordingly, in the flat cable 200 led out from the second cable guide path 40, the twist applied in the first cable guide path 30 is cancelled each other. Thus, the flat cable 200 has no twist and is in a state that the displacement e in the direction of width of the flat cable 200 and the reversing movement are applied thereto.

Further, according to the flat-cable guide device 1 of the above-described embodiment, the first cable guide path 30 and the second cable guide path 40 are parts which arrange the flat cable 200 substantially in a linear configuration and the slits S1 and S2 in both the ends of the guide paths respectively regulate an attitude of the cable. Accordingly, when the flat cable 200 led out from the flat-cable guide device 1 is, for instance, pulled so that the flat cable 200 inserted into the device is moved in a direction of length of the cable, the attitude of the cable is not unstable. Further, the third cable guide path 50 arranged between the first cable guide path 30 and the second cable guide part 40 is a part which arranges the flat cable 200 in a configuration of a U-shape between the two slits S2 and S2 parallel to each other. This part can also maintain the flat cable 200 moving in the direction of length of the cable in a stable attitude.

Accordingly, in any of the guide paths forming the flat-cable guide device 1, the attitude of the flat cable 200 is not unstable during a movement of the flat cable 200 and a mobility of the flat cable 200 is not deteriorated.

Further, according to the flat-cable guide device 1 of the above-described embodiment, the flat cable 200 is arranged so as to be configured in the shape of a character U as a whole. The first cable guide path 30 and the second cable guide path 40 are located within a duplicate length range and settled in the same occupied space. Accordingly, the device can be prevented from being enlarged and the flat cable 200 can be arranged in a small space.

As described above, according to the flat-cable guide device 1 of the above-described embodiment, the displacement in the direction of width of the flat cable 200 and the reversing movement can be applied in a small space without deteriorating the mobility of the flat cable 200.

Further, according to the flat-cable guide device 1 of the present embodiment, since the first cable guide path 30 and the second cable guide path 40 have the same structures, kinds of components used in the device are reduced, so that a cost can be reduced.

The present invention is not limited to the above-described embodiment and may be suitably modified and improved. In addition thereto, as long as the present invention can be achieved, materials, forms, dimensions, numbers, arranged positions or the like of component elements in the above-described embodiment are respectively arbitrarily used and are not limited.

For instance, in the first cable guide path 30 and the second cable guide path 40, the slits S1 and S2 respectively provided therein may be common to each other and entire parts thereof do not need to have the same structures. For instance, other structures may be considered that the first cable guide path 30 is formed integrally with a casing of the cable excess length winding device 20 adjacent thereto, or an engagement unit by which the first cable guide path is connected to the cable excess length winding device 20 is provided to have a different structure from that of the cable guide path 40.

Further, in the structure of the present embodiment, the first cable guide path 30 located in a low position is connected to the cable excess length winding device 20. However, when a position of the fixed part to which one end of the flat cable 200 is connected is located in a position higher than that of the movable part, a structure may be considered that the cable excess length winding device 20 is connected to the second cable guide path 40.

Further, in the above-described embodiment, the cable excess length winding device 20 which accommodates an excess length of the flat cable 200 is provided in such a form that the cable excess length winding device is connected to the first cable guide path 30. However, the flat-cable guide device of the present invention may not be provided with the cable excess length winding device 20, but may be formed only by the first cable guide path 30, the second cable guide path 40 and the third cable guide path 50.

This application is based on Japanese Patent Application (Application No. 2013-244264) filed on Nov. 26, 2013 and contents thereof are incorporated herein by way of a reference.

Here, features of the above-described embodiment of the flat-cable guide device according to the present invention are briefly stated and listed together in below-described [1] to [3] respectively.

[1] A flat-cable guide device (1) including:

a first cable guide path (30) in which linear slits (S1, S2) allowing a flat cable (200) to be inserted are respectively provided in one pair of a front end wall (31) and a rear end wall (32) opposed to each other in front and rear parts and the slit (32) in the rear end wall (32) is inclined at a prescribed angle (θ) to the slit (S1) in the front end wall (31);

a second cable guide path (40) in which linear slits (S1, S2) allowing the flat cable (200) to be inserted are respectively provided in one pair of a front end wall (41) and a rear end wall (42) opposed to each other in front and rear parts and the slit (S2) in the rear end wall (42) is inclined at the prescribed angle (θ) to the slit (S1) in the front end wall (41) and which is arranged so as to be spaced from the first cable guide path (30) in a direction intersecting at right angles to an extending direction of the slit (S2) in the rear end wall (32) of the first cable guide path (30); and a third cable guide path (50) in which the slit (S2) in the rear end wall (32) of the first cable guide path (30) is connected to the slit (S2) in the rear end wall (42) of the second cable guide path (40) by a U-shaped guide path (53) in which the flat cable (200) is movable.

[2] The flat-cable guide device (1) described in the above-described [1], wherein the first cable guide path (30) and the second cable guide path (40) have the same structures.

[3] The flat-cable guide device (1) described in the above-described [2], wherein the first cable guide path (30) and the second cable guide path (40) are arranged so that the front and rear positions are consistent.

INDUSTRIAL APPLICABILITY

Since the flat-cable guide device of the present invention can apply the displacement in a direction of width and the reversing movement of the flat cable in a small space without deteriorating the mobility of the flat cable, the flat-cable guide device is available when the flat cable is arranged in a movable part, for instance, a slide door or a slide seat of a vehicle.

REFERENCE SIGNS LIST 1 flat-cable guide device
30 first cable guide path
31 front end wall
32 rear end wall
40 second cable guide path
41 front end wall
42 rear end wall
50 third cable guide path
200 flat cable
S1, S2 slit
θ angle of inclination

The invention claimed is:

1. A flat-cable guide device including:
a first cable guide path having a front end wall and a rear end wall opposed to each other in a first cable guiding direction, wherein a first linear slit and a second linear slit, each allowing a flat cable to be inserted in the first cable guiding direction, are provided in the front end wall and the rear end wall, respectively, wherein the second linear slit in the rear end wall is formed at an angle relative to the first linear slit in the front end wall;
a second cable guide path having a front end wall and a rear end wall opposed to each other in a second cable guiding direction, wherein a third linear slit and a fourth linear slit, each allowing the flat cable to be inserted in the second cable guiding direction, are provided in the front end wall and the rear end wall of the second cable guide path, respectively, the fourth linear slit in the rear end wall is inclined at the angle relative to the third linear slit in the front end wall, the second cable guide path being arranged so as to be spaced from the first cable guide path in a direction intersecting at right angles to an extending direction of the second linear slit in the rear end wall of the first cable guide path; and
a third cable guide path in which the second linear slit in the rear end wall of the first cable guide path is connected to the fourth linear slit in the rear end wall of the second cable guide path by a U-shaped guide path in which the flat cable is movable.

2. The flat-cable guide device according to claim 1, wherein the first cable guide path and the second cable guide path have the same structure.

3. The flat-cable guide device according to claim 2, wherein the first cable guide path and the second cable guide path are arranged at same positions in the first cable guiding direction.

4. The flat-cable guide device according to claim 1, wherein the first linear slit and the second linear slit of the first cable guide path are discontinuous and spaced apart from one another in the first cable guiding direction, and
wherein the third linear slit and the fourth linear slit of the second cable guide path are discontinuous and spaced apart from one another in the second cable guiding direction.

5. The flat-cable guide device according to claim 1, wherein the front end wall and the rear end wall of the first cable guide path are spaced apart from one another in the first cable guiding direction.

* * * * *